US006982745B2

(12) United States Patent
Miyabayashi

(10) Patent No.: US 6,982,745 B2
(45) Date of Patent: Jan. 3, 2006

(54) ANTENNA LEVEL DISPLAY DEVICE AND METHOD, AND RECEIVING APPARATUS

(75) Inventor: Naoki Miyabayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 609 days.

(21) Appl. No.: 10/304,224

(22) Filed: Nov. 26, 2002

(65) Prior Publication Data

US 2004/0075771 A1   Apr. 22, 2004

(30) Foreign Application Priority Data

Nov. 27, 2001  (JP) ............................. 2001-361527

(51) Int. Cl.
*H04N 5/50*   (2006.01)
*H04N 5/445*  (2006.01)
*H04N 17/00*  (2006.01)

(52) U.S. Cl. ...................... 348/193; 348/569; 348/570; 348/725; 348/180; 455/226.3; 455/67.11; 342/359; 725/72

(58) Field of Classification Search ............... 348/569, 348/570, 725, 726, 720, 729, 180, 193; 455/3.02, 455/25, 250.1, 562.1, 63.1, 566, 67.11, 226.1, 455/226.2, 226.3, 226.4; 342/359, 358; 375/227, 375/228; 725/72

See application file for complete search history.

(56) References Cited

U.S. PATENT DOCUMENTS

| 4,214,273 | A | * | 7/1980 | Brown ........................ 348/569 |
| 4,696,057 | A | * | 9/1987 | Otani .......................... 455/228 |
| 4,835,790 | A | * | 5/1989 | Yoshida et al. ............. 375/227 |
| 4,918,532 | A | * | 4/1990 | O'Connor ................... 348/726 |
| 4,935,814 | A | * | 6/1990 | Omoto et al. ............... 348/193 |
| 5,376,941 | A | * | 12/1994 | Fukazawa et al. .......... 342/359 |
| 5,436,675 | A | * | 7/1995 | Hayashi et al. ................ 725/72 |
| 5,603,114 | A | * | 2/1997 | Tomita ..................... 455/249.1 |
| 5,940,028 | A | * | 8/1999 | Iwamura ..................... 342/359 |
| 5,966,186 | A | * | 10/1999 | Shigihara et al. ........... 348/570 |
| 6,011,511 | A | * | 1/2000 | Chuong et al. ............. 342/359 |
| 6,028,894 | A | * | 2/2000 | Oishi et al. ................. 375/227 |
| 6,104,341 | A | * | 8/2000 | Mita et al. .................. 342/359 |
| 6,356,302 | B1 | * | 3/2002 | Kawakami et al. ......... 348/193 |
| 6,441,847 | B1 | * | 8/2002 | Link et al. .................. 348/180 |
| 6,580,452 | B1 | * | 6/2003 | Gangitano .................. 348/180 |
| 6,671,496 | B1 | * | 12/2003 | Hoshi .......................... 455/78 |
| 6,850,736 | B2 | * | 2/2005 | McCune, Jr. ............. 455/67.13 |
| 6,882,693 | B2 | * | 4/2005 | Ozeki et al. ................ 375/345 |
| 6,931,242 | B2 | * | 8/2005 | Hong ..................... 455/234.1 |

* cited by examiner

*Primary Examiner*—Brian Yenke
*Assistant Examiner*—Jean W. Désir
(74) *Attorney, Agent, or Firm*—Frommer Lawrence & Haug LLP; William S. Frommer

(57) ABSTRACT

An antenna level display device capable of faithfully reflecting any deterioration of a picture quality in receiving a satellite broadcast. In this display device, orthogonal detection of an input signal is executed in a demodulator, and a CN ratio is calculated from a conversion table in a ROM according to the mean value of deflections of mapped points of the received signal on an IQ plane. The demodulated data is compared, in a comparator, with the demodulated data obtained after error correction by a Viterbi decoder, and a CN ratio is calculated on the basis of the bit error rate from a conversion table stored in another ROM. A decision is made to select one CN ratio, which is to be displayed as an antenna level, out of the two calculated CN ratios, and the selected CN ratio is displayed through adaptive switching. Consequently, despite any deterioration of the receiving environment derived from occurrence of phase noise in a converter or the like, it is still possible to display a proper antenna level reflecting the receiving circumstances.

17 Claims, 10 Drawing Sheets

F I G. 2
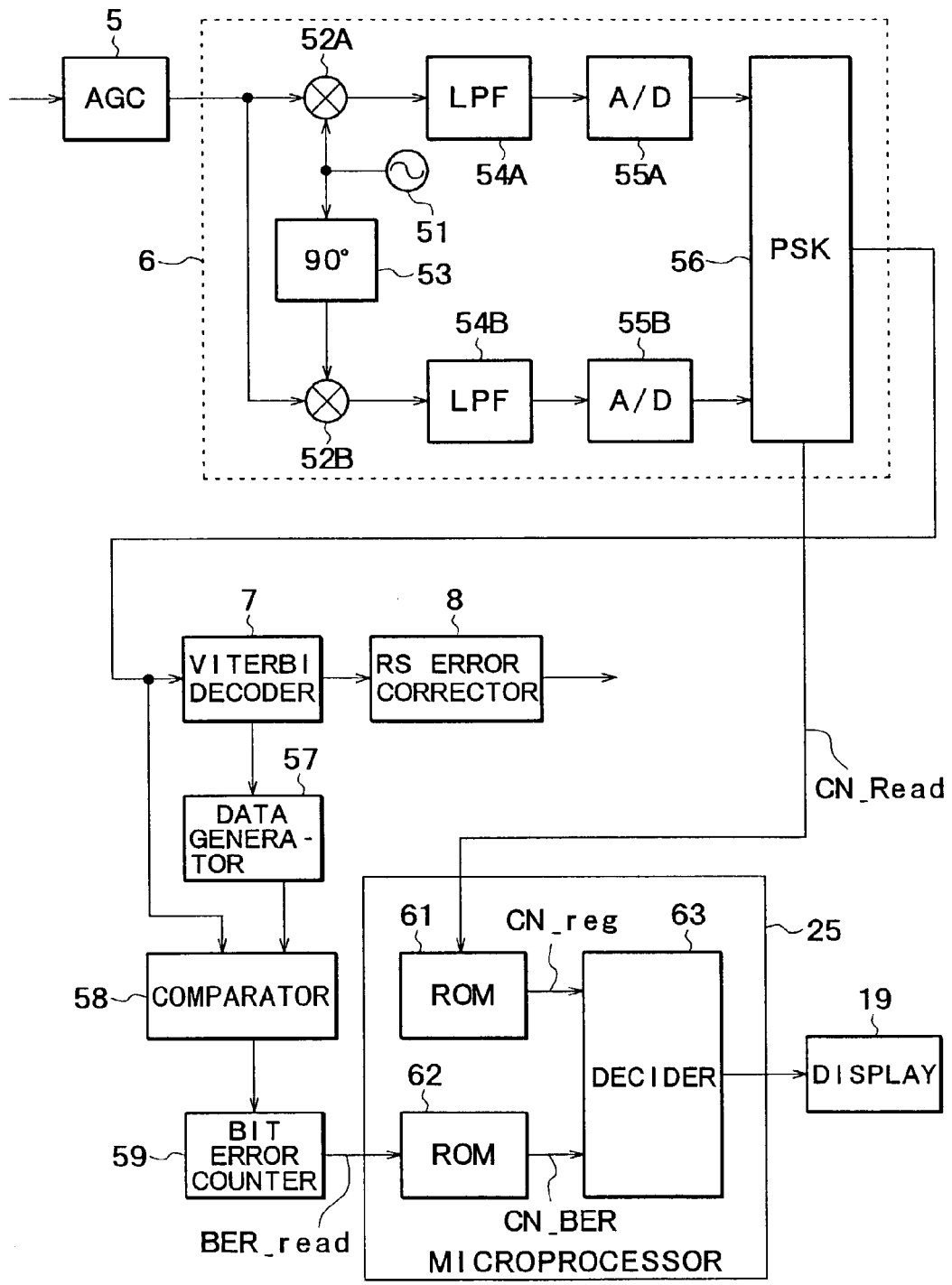

F I G. 3
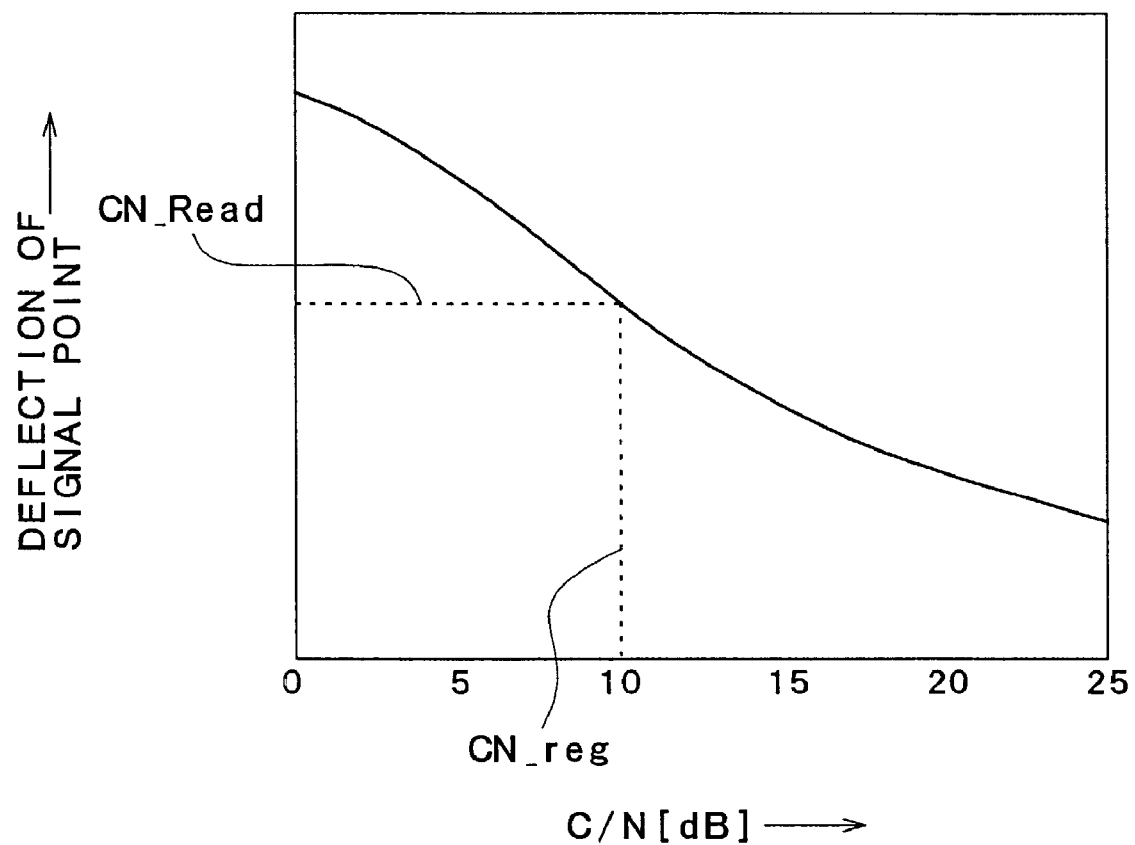

F I G. 9 A   F I G. 9 B
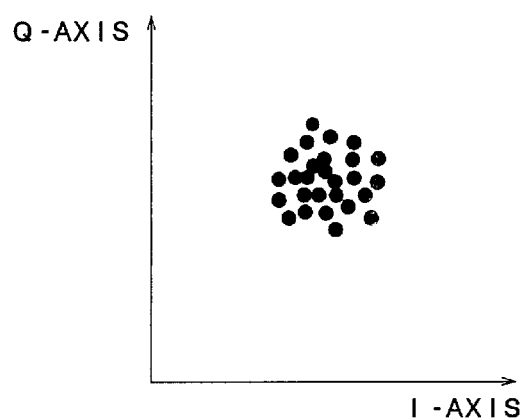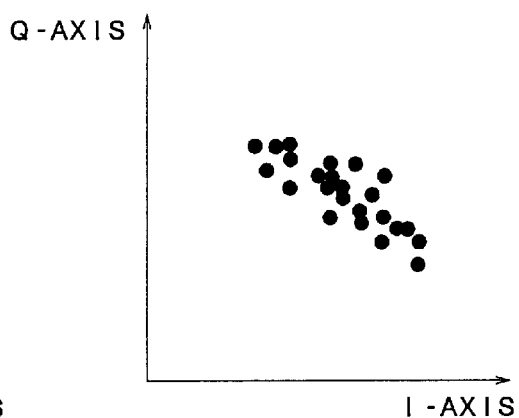

F I G . 1 0

| C/N [dB] | BIT ERROR RATE | TIME REQUIRED FOR OBSERVING ONE ERROR |
|---|---|---|
| 6 | $5.0 \times 10^{-4}$ | 1.2 msec |
| 8 | $2.6 \times 10^{-5}$ | 6.0 msec |
| 10 | $2.5 \times 10^{-7}$ | 0.57 sec |
| 12 | $2.0 \times 10^{-10}$ | 460 sec |

ANTENNA LEVEL DISPLAY DEVICE AND METHOD, AND RECEIVING APPARATUS

BACKGROUND OF THE INVENTION

The present invention relates to an antenna level display device, an antenna level display method and a receiving apparatus adapted for displaying an antenna level in a digital satellite broadcast receiving tuner or a television receiver having such a tuner therein.

A satellite broadcast receiving tuner or a satellite broadcast receiving apparatus such as a television receiver with an internal tuner is equipped with an antenna level display function for displaying the CN (carrier-to-noise) ratio of an input signal received from a satellite by an antenna. This antenna level display function is utilized to fulfill two broadly classified roles.

The first role is to realize proper directional adjustment of an antenna at the time of installing the antenna and adjusting its direction, in such a manner that the level of the received signal obtained from the antenna becomes maximum. In satellite broadcasting, a parabolic antenna having sharp directivity is used to receive the signal from the satellite. The CN ratio of the received signal is set to a maximum attainable value by properly adjusting the antenna direction while watching the displayed antenna level, so that a wide margin of the CN ratio can be ensured until the reception becomes impossible, hence achieving a satisfactory receiving environment suited to deal with deterioration of the environment due to rainfall or the like.

And the second role is to search for the cause of any disturbance in the reception. Generally, occurrence of a reception disturbance is derived from deterioration of the receiving environment or from some fault in the receiver. It is possible to judge, from the antenna level being displayed, whether the reception disturbance is derived from any environmental deterioration or not. That is, in case the reception disturbance has occurred due to the environmental deterioration, a search is made as to whether the CN ratio of the received signal is sufficiently high or not. And if the antenna level is not sufficient, the disturbance can be judged to result from some environmental deterioration in the reception. In this case, the cause may be such that the antenna is not directed exactly toward the satellite, or there exists a building or the like as an obstacle to the broadcast waves. Also in this case, the cause may include a fault of a converter, breaking of a feeder, failure of a connector and so forth. In contrast therewith, if the antenna level is sufficient, the condition can be so judged that at least the signal from the satellite is properly received by the antenna and that the tuner or the television receiver is probably faulty.

In the conventional analog satellite broadcast receiver, an antenna level is displayed in accordance with the gain of an AGC (Automatic Gain Control) amplifier (as disclosed in, e.g., U.S. Pat. No. 3,134,412). More specifically, an intermediate frequency amplifying stage in the satellite broadcast receiver has an AGC circuit for keeping the level of a received signal constant. In the AGC circuit, the level of the received signal is detected, and then the gain of the AGC amplifier is set in accordance with the detected level of the received signal. And the set gain of the AGC amplifier is displayed as an antenna level.

Thus, in the conventional analog satellite broadcast receiver, the antenna level is displayed on the basis of the gain of the AGC amplifier. However, in a digital satellite broadcast receiver where digital modulation is adopted, a sufficiently high precision is not attainable by displaying the antenna level in accordance with the gain of the AGC amplifier. For this reason, in the known digital satellite broadcast receiver, a CN ratio is calculated from a constellation representing the coordinates of mapped signal points on an IQ plane.

That is, in digital satellite broadcast, 8PSK (Phase Shift Keying) for example is adopted as a modulation mode. In this 8PSK modulation, data are arrayed correspondingly to eight signal points P1 to P8 on an IQ plane having an I-axis and a Q-axis orthogonal thereto, as shown in FIG. 7.

Assuming generally that the entire noise included in the signal waves is composed merely of random noise, the points of the received signal are dispersed, as shown in FIG. 8, around signal points S1 and S2 which are obtained in an original noiseless state, in a probability distribution conforming with a normal distribution. More specifically, the point of the received signal to be positioned at a signal point S1 is dispersed as indicated by a curve A1 in FIG. 8, and also the point of the received signal to be positioned at an adjacent signal point S2 is dispersed as indicated by a curve A2. Due to such dispersion, the received signal within an area L1 beyond an intermediate point between the signal points S1 and S2 of mutually adjacent codes is received as a wrong code.

On the basis of such relationship, the deviation of the received signal point and the CN ratio can be correlated with each other. That is, if the noise included in the signal waves is assumed to be random noise, the deflection of the received signal point on the IQ plane corresponds to the CN ratio.

In calculating the CN ratio from the mean value of the deflections of the received signal points on the IQ plane, the received signal points are mapped on the IQ plane by a demodulator, and then the mean value of the deflections of the individual signal points is measured from the I-signal and the Q-signal. And a measuring system is prepared for setting a modulation signal of a desired CN ratio by superposing random noise. In this measuring system, there is measured the mean value of the deflections of the received signal points. Then a conversion table is formed with regard to the mean value of the measured deflections of the individual signal points and the CN ratio. And the conversion table is stored in a ROM (Read Only Memory).

Upon reception of the input signal, points of the received signal are mapped on the IQ plane by the demodulator, and the mean value of the deflections of the signal points is measured. Then the CN ratio is calculated from the mean value of the deflections of the received signal points by using the conversion table stored in the ROM. And the CN ratio thus obtained from the deflections of the received signal points mapped on the IQ plane is displayed as an antenna level.

In the Japanese digital satellite broadcast, the stationary satellite located above the equator and at 110° C. of east longitude is utilized through a network of 12 GHz band, as in the precedent analog satellite broadcast. Therefore, in shifting from the analog satellite broadcast to the digital one, the existing antenna used previously for the analog satellite broadcast is still usable. In shifting from the analog satellite broadcast to the digital one, if the existing antenna for the analog satellite broadcast is used continuously, it is not necessary to purpose a new antenna or to readjust the direction of the antenna either, hence realizing a ready shift from the analog satellite broadcast to the digital one. For this reason, when receiving the digital satellite broadcast, many users continuously use the existing antenna which has been used for receiving the analog satellite broadcast.

However, there is reported a problem that, when receiving the digital satellite broadcast by the antenna used previously for the analog satellite broadcast, a reception disturbance occurs though the displayed antenna level indicates a sufficient CN ratio. The cause of such a problem is considered as follows.

An antenna for receiving a satellite broadcast is equipped internally with a converter for converting a received signal of 12 GHz band into an intermediate frequency signal of 1 GHz band. Some of the known converters in the antennas for receiving the analog satellite broadcast contain much phase noise. However, since the analog satellite broadcast is transmitted through frequency modulation of analog video signal, high tolerance is ensured against the residual FM noise and therefore proper reception can still be achieved even by an antenna equipped with a converter containing much phase noise.

Meanwhile in 8PSK modulation employed for the digital satellite broadcast, the distance between signal points is short and, when the phase noise is great, it is erroneously judged to be an adjacent code by the demodulator, so that the reception characteristic may be deteriorated. Therefore, if the digital satellite broadcast is received by the antenna used originally for receiving the analog satellite broadcast, a reception disturbance may be caused by the phase noise in the converter.

When such a reception disturbance has occurred due to some harmful influence of the phase noise in the converter, an adequate measure may be taken with facility if the antenna level being displayed reflects faithfully the deterioration of the CN ratio derived from the phase noise.

That is, as mentioned, one role of displaying the antenna level is to search for the cause of a reception disturbance upon occurrence of such disturbance. Therefore, the antenna level is confirmed when a reception disturbance has occurred due to some harmful influence of the phase noise in the converter for example. At this time the carrier level to the noise is lowered, so that if the deterioration of the CN ratio derived from the phase noise is faithfully reflected, the CN ratio being displayed as an antenna level is also lowered. And when the antenna level is lowered, it is seen that the cause is not concerned with at least the satellite broadcast receiver or the television receiver and that the cause is derived from deterioration of the receiving environment of the antenna system, whereby an adequate measure may be taken with facility.

However, in the conventional digital satellite broadcast receiver where the noise is assumed to be random noise as mentioned, the CN ratio is calculated from the deflections of the signal points on the IQ plane, so that the deterioration of the CN ratio due to the phase noise fails to be faithfully reflected.

More specifically, in the known method of measuring the CN ratio in the digital satellite broadcast, the noise is assumed to be random noise conforming with a normal distribution, but the noise superposed on the actual received signal is not limited to random noise alone and may include phase noise therein as described. The phase noise partially includes deviations of frequency components.

If the noise is random one conforming with a normal distribution, the points of the received signal are distributed in the shape of a true circle, as shown in FIG. 9A. However, if some phase noise is included, the points of the received signal are not distributed in the shape of a true circuit and are dispersed in the circumferential direction, as shown in FIG. 9B (Reference paper: IEEE Trans. On Consumer Electronics, Vol. 41, No. 3, August 1995, "QAM FOR TERRESTRIAL AND CABLE TRANSMISSION"). Therefore, if any phase noise is included in the received signal, exact evaluation of the CN ratio is not attainable according to the known CN ratio conversion table prepared on an assumption that the points of the received signal are distributed in the shape of a true circle.

Thus, in the conventional display of an antenna level in the digital satellite broadcast, the CN ratio fails to be faithfully measured with regard to the phase noise. And therefore, when a reception disturbance has occurred due to the phase noise in the converter for example, the measured CN ratio may erroneously be displayed as a sufficient antenna level. Consequently, the expense burden on both consumers and manufacturers for search, inspection and so forth is rendered great.

There may be contrived a method of adding frequency deviation noise as a new item of phase noise and displaying the same. However, if the random noise and the phase noise are both displayed, the general user is obliged to comprehend the information of such two noises and to deal with them separately, whereby the burden is further increased.

There is known a method of indicating the antenna level by counting the number of actual errors as an index to faithfully represent the harmful influence exerted on the picture quality by the deterioration of the received signal. However, if this method of indicating the antenna level by counting the number of errors is adopted, there arises another problem that the time required for measuring the CN ratio becomes longer with a rise of the CN ratio.

FIG. 10 shows bit error rates in relation to respective CN ratios and the time required for observing one error in each case. As shown in FIG. 10, the bit error rate becomes lower with a rise of the CN ratio to thereby prolong the time required for observing one error. For example, when the CN ratio is 6 dB, the time required for observing one error is 1.2 msec. However, when the CN ratio rises to 12 dB, the time required for observing one error becomes 460 sec. Therefore, if the method to indicate the antenna level by counting the number of errors is adopted, a longer time is required in measurement particulaly when the CN ratio is higher.

Thus, in the method to indicate the antenna level by counting the number of errors, longer-time measurement is necessary with a rise of the CN ratio, so that it becomes difficult to adjust the antenna position while watching the displayed antenna level. More specifically, in initial setting, the user adjusts the antenna direction in a manner to maximize the antenna level while watching the displayed antenna level. In this case, it is desired that the time required for attaining a reflection of the CN ratio in the antenna level should be within a range of 0.5 to 1 second. Further, when the antenna position is to be adjusted, reduction of the CN ratio due to attenuation by rainfall or the like needs to be taken into consideration in the digital satellite broadcast, so that it is important to set the antenna level as high as possible at the time of adjusting the antenna level, and the CN ratio needs to be given a wide margin to an unreceivable state. However, in the system of measuring the CN ratio from the bit error rate, it is impossible to achieve proper measurement of the CN ratio in a short time particularly when the CN ratio is high, whereby proper adjustment of the antenna direction is not attainable while watching the indicated antenna level.

SUMMARY OF THE INVENTION

It is therefore an object of the present invention to provide an antenna level display device, an antenna level display method and a receiving apparatus capable of displaying, in reception of a satellite broadcast, a proper antenna level which faithfully reflects any deterioration of a picture quality.

And another object of the present invention resides in providing an antenna level display device, an antenna level display method and a receiving apparatus adapted for displaying, when determining the direction of an antenna, a stable antenna level with a sufficiently fast response.

According to a first aspect of the present invention, there is provided an antenna level display device which includes first CN ratio calculating means for calculating a CN ratio based on the deflections of mapped points of a received signal on an IQ plane; second CN ratio calculating means for calculating a CN ratio based on the error rate of the received signal; deciding means for selecting, as an antenna level to be displayed, either the CN ratio calculated by the first CN ratio calculating means and based on the deflections of the mapped points of the demodulated received signal on the IQ plane, or the CN ratio calculated by the second CN ratio calculating means and based on the error rate; and display means for displaying the CN ratio selected as an antenna level by the deciding means.

According to a second aspect of the present invention, there is provided an antenna level display method which includes a step of calculating a CN ratio based on mapped points of a received signal on an IQ plane; a step of calculating a CN ratio based on an error rate; a step of selecting, as an antenna level to be displayed, either the CN ratio based on the mapped points of the received signal on the IQ plane or the CN ratio based on the error rate; and a step of displaying the selected CN ratio as an antenna level.

And according to a third aspect of the present invention, there is provided a receiving apparatus to receive a digital television broadcast. This apparatus includes demodulating means for demodulating a received signal of a digital television broadcast; first CN ratio calculating means for calculating a CN ratio based on the deflections of mapped points of the demodulated received signal on an IQ plane; second CN ratio calculating means for calculating a CN ratio based on the error rate of the demodulated received signal; deciding means for selecting, as an antenna level to be displayed, either the CN ratio calculated by the first CN ratio calculating means and based on the deflections of the mapped points of the received signal on the IQ plane, or the CN ratio calculated by the second CN ratio calculating means and based on the error rate; and display means for displaying the CN ratio selected by the deciding means as an antenna level.

Two techniques are known with respect to detection of a CN ratio. One is carried out by calculating the CN ratio in accordance with the mean value of the deflections of mapped points of a received signal on an IQ plane, and the other is carried out by calculating the CN ratio in accordance with the bit error rate. In the former case of calculating the CN ratio in accordance with the mean value of the deflections of mapped points of a received signal on an IQ plane, high-precision measurement of the CN ratio can be performed stably even in a high C/N area, but exact evaluation is not attainable with regard to any unexpected noise other than random noise. Meanwhile in the latter case of calculating the CN ratio in accordance with the bit error rate, deterioration of the received signal can be exactly evaluated regardless of the kind of noise, although the response time characteristic is inferior in a high C/N area.

Therefore, the CN ratio to be displayed is selectively judged from the CN ratio measured in accordance with the mean value of the deflections of mapped points of the received signal on the IQ plane and the CN ratio measured in accordance with the bit error rate, and then the selected one is adaptively switched to be displayed. Consequently, even in case the receiving environment is deteriorated due to some phase noise in the converter or the like, it becomes possible to properly display the antenna level which reflects the receiving circumstance faithfully. And in adjusting the antenna direction while watching the displayed antenna level, the antenna level can be displayed stably with a fast response.

The above and other features and advantages of the present invention will become apparent from the following description that will be given with reference to the illustrative accompanying drawings.

BRIEF DESCRIPTION OF THE DRAWINGS

FIG. 2 is a block diagram showing an example of an antenna level display device where the present invention is applied;

FIG. 3 graphically explains a conversion table related to the deflections of signal points and the CN ratio;

FIGS. 9A and 9B graphically show a distribution of signal points in occurrence of random noise and occurrence of phase noise, respectively; and FIG. 10 is a schematic diagram for explaining detection of a CN ratio from a bit error rate.

DETAILED DESCRIPTION OF THE PREFERRED EMBODIMENTS

Figure 1:
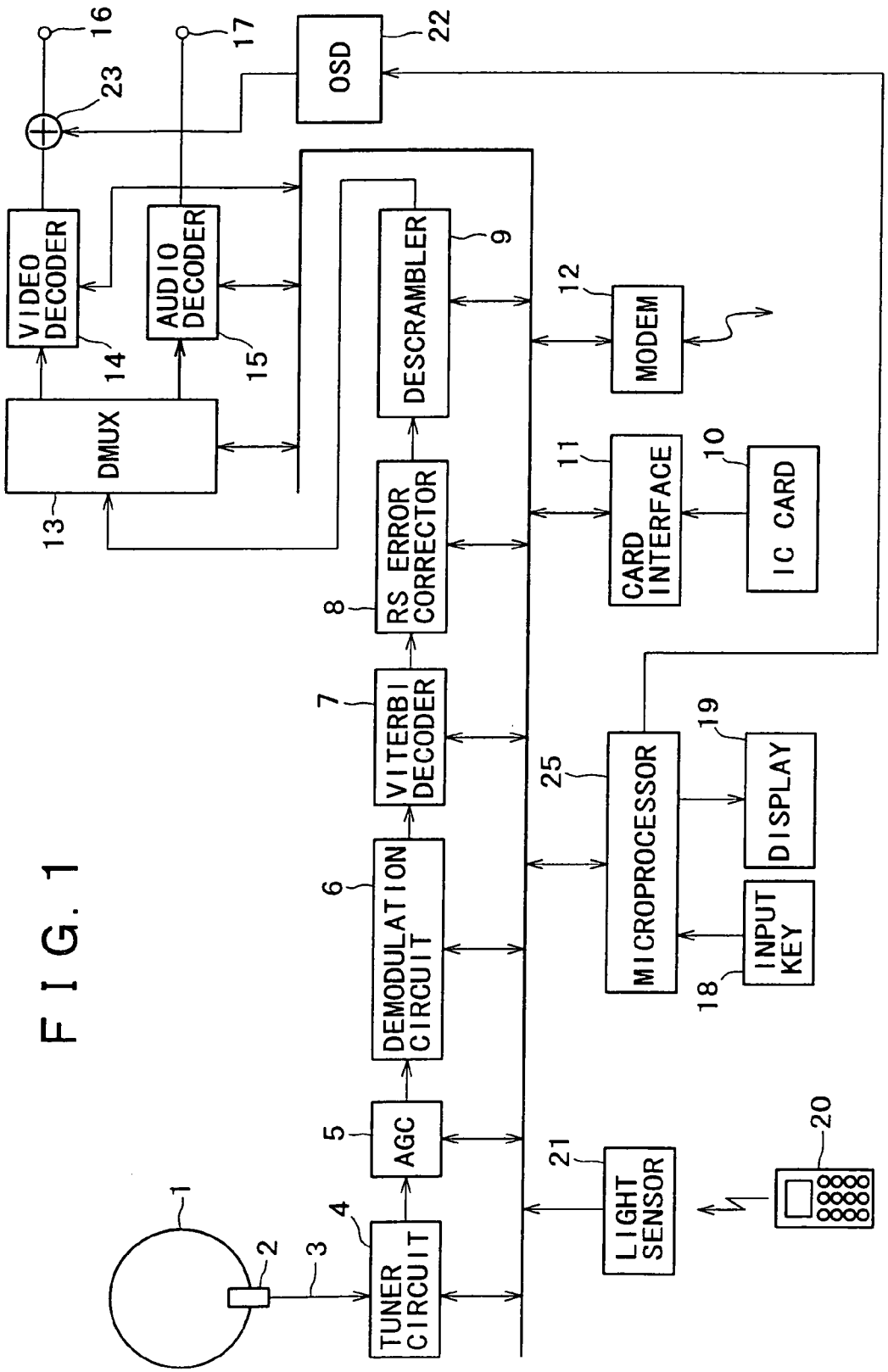
FIG. 1 is a block diagram showing an example of a digital satellite broadcast receiving apparatus where the present invention is applicable.

Hereinafter some preferred embodiments of the present invention will be described in detail with reference to the accompanying drawings. FIG. 1 shows an example of a digital satellite broadcast receiving apparatus where the present invention is applied. In FIG. 1, radio waves of a digital satellite broadcast transmitted via a satellite of 12 GHz band for example are received by a parabolic antenna 1 and then are converted by a converter 2, which is connected to the parabolic antenna 1, into a first intermediate frequency signal of 1 GHz band for example. The output of this converter 2 is supplied to a tuner circuit 4 via a cable 3.

A channel selection signal is supplied to the tuner circuit 4 from a microprocessor 25. In response to the channel selection signal thus obtained from the microprocessor 25, the tuner circuit 4 selects a signal of a desired carrier frequency out of the entire received signals, and then the signal of the selected carrier frequency is converted into a second intermediate frequency signal.

The intermediate frequency signal is supplied from the tuner circuit 4 to an AGC circuit 5. The intermediate frequency signal from the tuner circuit 4 is amplified by the AGC circuit 5, where the gain is so controlled that the level of the received signal is maintained constant. And the output of the AGC circuit 5 is supplied to a demodulation circuit 6.

The demodulation circuit 6 is capable of performing demodulation in BPSK (Binary Phase Shift Keying), QPSK (Quadrature Phase Shift Keying) and 8PSK (8 Phase Shift Keying) modes.

That is, in digital satellite broadcast, hierarchical transmission is executed in BP-SK, QPSK and 8PSK modes. In the 8PSK mode where the amount of information per symbol is increased, the error rate is deteriorated if there occurs attenuation due to rainfall. Meanwhile in the BPSK or QPSK mode, although the quantity of information per symbol is decreased, the error rate is not so deteriorated despite an attenuation caused due to rainfall.

On the transmitter side, one TS packet is assigned correspondingly to one slot, and individual TS packets are mapped on a frame consisting of 48 slots. A modulation mode and an encoding rate may be allocated to each slot. And the kind of the modulation mode and the encoding rate allocated to each slot are transmitted by a TMCC (Transmission and Multiplexing Configuration Control) signal. A super-frame is composed in unit of eight frames, and interleaving is executed at the position of each slot.

A transport stream is demodulated in the demodulation circuit 6. The output of the demodulation circuit 6 is supplied to a Viterbi decoder 7, which then executes error correction of an inner code. Subsequently the output of the Viterbi decoder 7 is supplied to an error corrector 8, which then executes error correction of an outer code.

More specifically, the error correction encoding system employed for digital satellite broadcast includes Reed-Solomon code (204, 188) as an outer code and Trelice code or convolutional code as an inner code. The Viterbi decoder 7 executes error correction of the inner code, and the error corrector 8 executes error correction of the outer code based on Reed-Solomon code.

The ouput of the error corrector 8 is supplied to a descrambler 9, where CAS (Condition Access System) control is executed.

That is, in the case of limited reception, the transport stream is encrypted. Individual information is stored in an IC card 10, which is loaded via a card interface 11.

The descrambler 9 is supplied with the information of the received ECM (Encryption Control Message) and EMM (Entitlement Management Message) sections, and also with descramble key data stored in the IC card 10. In the case of limited reception, descrambling is executed in the descrambler 9 by using the received ECM, EMM and the information of the IC card 10.

A modem 12 is provided, and billing information is sent to a program broadcast center via the modem 12 by means of a telephone line.

The transport stream descrambled in the descramber 9 is sent to a demultiplexer 13.

The demultiplexer 13 separates a stream of desired packets from the received transport stream. A packet identifier (PID) is described in the header of the packet. And in the demultiplexer 13, the packets are separated, in accordance with the PID, into a video PES (Packetized Elementary Stream) packet, an audio PES packet, a data packet, a PSI (Program Specific Information) packet, and an SI (Specific Information) packet of a desired program.

The video PES packet of the desired program is sent to a video decoder 14, and the audio PES packet thereof is sent to an audio decoder 15. Meanwhile the data packet, PSI packet and SI packet are sent to a microprocessor 25.

The video decoder 14 receives the video PES packet from the demultiplexer 13 and then decodes the information in conformity with the MPEG (Moving Picture Coding Experts Group) b 2 format, thereby reproducing the video signal. The video signal thus reproduced is delivered from an output terminal 16.

The audio decoder 15 receives the audio PES packet from the demultiplexer 13 and then decodes the information in conformity with the MPEG2-AAC (MPEG2 Advanced Audio Coding) format, thereby reproducing the audio signal. The audio signal thus reproduced is delivered from an output terminal 17.

A manual input is given by means of an input key 18. Here, the input key 18 includes various keys and switches arrayed on a panel of a receiver for example. A manual input can also be given by the use of an infrared remote controller 20 as well. A light sensor 21 is provided for sensing an infrared command signal emitted from the infrared remote controller 20, and the output signal from the light sensor 21 is sent to the microprocessor 25.

Each of setting modes is executed by a display unit 19. The display unit 19 includes, e.g., a liquid crystal display disposed on the panel, LEDs (Light Emitting Diodes) and so forth. Further a display signal from the microprocessor 25 is supplied to an OSD (On Screen Display) circuit 22, whose output is then combined with the video signal by an adder 23. Thus, each of the various setting modes can be displayed in the picture being received.

In the digital satellite broadcast receiver described above, the present invention is adapted for displaying an antenna level on the screen by means of the display unit 19 or the OSD circuit 22.

FIG. 2 shows an example of an antenna level display circuit where the present invention is applied. In this embodiment, the antenna level is displayed on the basis of a CN ratio obtained from deflections of mapped points of the received signal on an IQ plane and also on the basis of a CN ratio obtained from an error rate.

In FIG. 2, the received signal is outputted via an AGC circuit 5, and the output of the AGC circuit 5 is supplied to a demodulation circuit 6. The demodulation circuit 6 includes a local oscillator 51, multipliers 52A and 52B, a 90° C. phase shifter 53, low pass filters 54A and 54B, A/D converters 55A and 55B, and a PSK demodulator 56.

The above local oscillator 51, multipliers 52A, 52B and 9° C. phase shifter 53 constitute an orthogonal detection circuit. The output of the AGC circuit 5 is supplied to the multipliers 52A and 52B. Meanwhile a carrier signal is outputted from the local oscillator 51. The output of the local oscillator 51 is supplied to the multiplier 52A while being supplied via the 90° C. phase shifter 53 to the multiplier 52B.

The multiplier 52A multiplies the received signal by the carrier signal obtained from the oscillator 51. And the multiplier 52B multiplies the received signal by the 90° C. phase shifted carrier signal. An I-axis signal component and a Q-axis signal component are obtained from the multipliers 52A and 52B respectively. The outputs of the multipliers 52A and 52B are supplied respectively to the low pass filters 54A and 54B, wherein the unrequired band components are removed. The outputs of the low pass filters 54A and 54B are supplied respectively to the A/D (Analog to Digital) converters 55A and 55B, wherein the I-axis signal component and the Q-axis signal component are digitized. The outputs of the A/D converters 55A and 55B are supplied to the PSK demodulator 56.

The digitized I-axis and Q-axis signal components are mapped on the IQ plane by the PSK demodulator 56. And the digital signal is demodulated from the codes allocated to the mapped signal points. Subsequently the digital signal thus demodulated is outputted as a transport stream.

The PSK demodulator 56 has another function of measuring the mean value of the deflections of the signal points from the demodulated I-axis and Q-axis signal components. The mean value of the deflections of the received signal points is supplied from the PSK demodulator 56 to a microprocessor 25. Then the microprocessor 25 calculates the CN ratio from the mean value of the deflections of the received signal points.

That is, there is prepared a measuring system which is capable of generating a signal modulated to a CN ratio of a desired strength by superposing random noise. This measuring system measures the mean value of the deflections of the signal points on the IQ plane obtained from the PSK demodulator 56 in the demodulation circuit 6. As shown graphically in FIG. 3, there is drawn up, from the measured mean value of the deflections of the signal points on the IQ plane, a conversion table related to the mean value (CN_Read) of the deflections of the signal points and the CN ratio (CN_reg). This conversion table is held in a ROM 61 of the microprocessor 25.

Upon reception of a broadcast signal in FIG. 2, the mean value (CN_Read) of the deflections of the signal points on the IQ plane obtained from the received signal is supplied from the PSK demodulator 56 to the microprocessor 25. As described, the microprocessor 25 has a ROM 61 containing a conversion table of the CN ratio (CN_reg) to the mean value (CN_Read) of the deflections of the signal points. By accessing the table in the ROM 61, there is calculated the CN ratio (CN_reg) corresponding to the mean value (CN_Read) of the deflections of the signal points obtained from the received signal.

The data demodulated in the PSK demodulator 56 is supplied to a Viterbi decoder 7, which then executes error correction of the inner code by soft decision and maximum likelihood decode. The output of the Viterbi decoder 7 is supplied to an RS error corrector 8, which then executes error correction of the outer code based on Reed-Solomon code.

The demodulated data after error correction of the inner code is obtained from the Viterbi decoder 7, and the output thereof is supplied to a data generator 57. Subsequently the output of the data generator 57 is supplied to a comparator 58. Meanwhile, the demodulated data obtained from the PSK demodulator 56 prior to the error correction is also supplied to the comparator 58.

In the comparator 58, the demodulated data prior to the error correction is compared with the demodulated data obtained after the error correction of the inner code, whereby any bit error is detected. And the output of the comparator 58 is supplied to a bit error counter 59 wherein bit errors are counted, so that a bit error rate is calculated.

In the data generator 57, the data obtained from the Viterbi decoder 7 is so processed as to enable a comparison of the pre-correction data with the post-correction data. More specifically, a convolutional code is attached as an inner code to the received data prior to error correction. However, since error correction of the inner code is executed in the Viterbi decoder 7, any convolutional code is not attached to the outut of the Viterbi decoder 7. Therefore, a convolutional code is attached in the data generator 57 for enabling a comparison of the pre-correction data with the post-correction data.

The output of the bit error counter 59 is supplied to the microprocessor 25, wherein the CN ratio is calculated in accordance with the number of the counted bit errors obtained from the output of the bit error counter 59.

That is, as in the aforementioned case of calculating the CN ratio from the mean value of the deflections of the received signal points, there is prepared a measuring system which is capable of generating a signal modulated to a desired CN ratio by superposing random noise. This measuring system measures a bit error rate from the output of the bit error counter 59. Consequently, as shown graphically in FIG. 4, there is drawn up a conversion table related to the bit error rate (BER_Read) and the CN ratio (CN_BER). This conversion table is held in a ROM 62 of the microprocessor 25.

Upon reception of a broadcast signal in FIG. 2, the bit error rate (BER_Read) obtained from the received signal is outputted from the bit error counter 59. And the bit error rate (BER_Read) is supplied to the microprocessor 25. As described, the microprocessor 25 has a ROM 62 containing a conversion table of the CN ratio (CN_BER) to the bit error rate (BER_Read). By accessing the conversion table in the ROM 62, there is calculated the CN ratio (CN_BER) corresponding to the bit error rate (BER_Read) of the received signal.

Thus, in this example, one CN ratio is calculated from the mean value of the deflections of the received signal points, and another CN ratio is calculated from the bit error rate. Then in a decider 63 of the microprocessor 25, the CN ratio more adapted to the receiving circumstances is selected on the basis of the CN ratio obtained from the deflections of the received signal points and also on the basis of the CN ratio obtained from the bit error rate. And the CN ratio thus selected is displayed as an antenna level on the display unit 19 (or the OSD circuit 22).

It is generally usual that the signal environment is judged to be good or bad with reference to the CN ratio, and therefore the CN ratio is employed as a most reliable scale for evaluation of an antenna level. Assuming that the kind of the noise included in the received signal is random noise as described, since the noise conforms with a normal distribution, a set of points of the received signal extends radially in the shape of a true circle in accordance with an increase of the noise intensity. It has been customary heretofore that the radius and the CN ratio are made to have a mutual correspondence of 1:1, and a conversion table is drawn up with regard to the mean value of the deflections of the received signal points and the CN ratio. However, this method is premised on an assumption that the noise in the signal is random noise conforming with a normal distribution. And in case the noise includes some phase noise for example, the calculated CN ratio fails to exactly reflect the signal environment.

In this embodiment, therefore, both the CN ratio calculated from the mean value of the deflections of the mapped points of the received signal on the IQ plane, and the CN value calculated from the bit error rate, are selectively used to display the proper CN ratio that faithfully reflects the signal environment.

Figure 5:
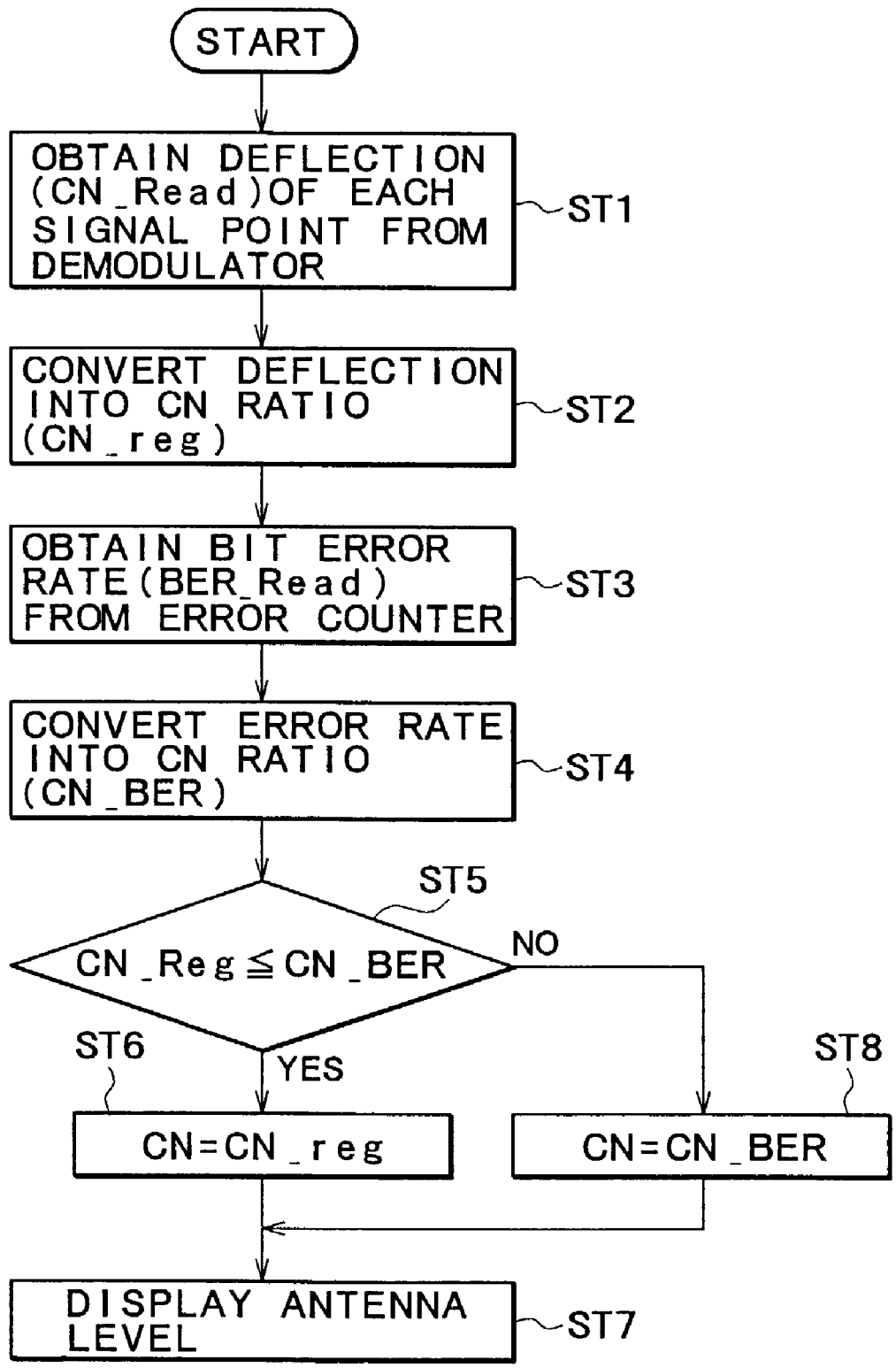
FIG. 5 is a flowchart of a processing routine executed for calculating the CN ratio to be displayed as an antenna level.

FIG. 5 is a flowchart showing a processing routine to selectively determine a proper CN ratio, which is to be displayed as an antenna level, on the basis of the CN ratio calculated from the mean value of the deflections of the mapped points of the received signal on the IQ plane, and also on the basis of the CN ratio calculated from the bit error rate. In the processing routine of FIG. 5, the CN ratio (CN_reg) obtained from the deflections of the mapped points of the received signal on the IQ plane is compared with the CN ratio (CN_BER) obtained from the bit error rate, and either CN ratio of a smaller value is adopted to be displayed.

In FIG. 5, first the mean value (CN_Read) of the deflections of the mapped points of the received signal on the IQ plane is obtained from the PSK demodulator 56 (step ST1), and the CN ratio (CN_reg) obtained from the deflections of the mapped points of the received signal on the IQ plane is calculated by accessing the ROM 61 (step ST2).

Then the bit error rate (BER_Read) is obtained from the output of the bit error counter 59 (step ST3), and the CN ratio (CN_BER) based on the bit error rate is calculated from the bit error rate (BER_Read) by accessing the ROM 62.

Subsequently the CN ratio (CN_reg) obtained from the mean value (CN_Read) of the deflections of the mapped signal points on the IQ plane is compared with the CN ratio (CN_BER) obtained from the bit error rate (CN_BER) (step ST5).

It is supposed here that generally the CN ratio (CN_reg) obtained from the mean value of the deflections of the signal points is substantially equal to the CN ratio (CN_BER) obtained from the bit error rate.

If the result of such a comparison at step ST5 indicates that the CN ratio (CN_reg) obtained from the deflections of the mapped signal points on the IQ plane is equal to the CN ratio obtained from the bit error rate, or the CN ratio (CN_reg) obtained from the deflections of the signal points is lower than the CN ratio (CN_BER) obtained from the bit error rate, then the CN ratio (CN_reg) obtained from the deflections of the signal points is selected to be displayed (i.e., CN=CN_reg) (step ST6), and the selected CN ratio is displayed as an antenna level on the display unit 19 (or the OSD circuit 22) (step ST7).

In general, the CN ratio (CN_reg) obtained from the mean value of the deflections of the signal points is substantially equal to the CN ratio (CN_BER) obtained from the bit error rate, whereby the result of the decision made at step ST5 signifies that the CN ratio (CN_reg) obtained from the deflections of the mapped signal points on the IQ plane is equal to the CN ratio (CN_BER) obtained from the bit error rate. In this case, the displayed antenna level is represented by the CN ratio (CN_reg) obtained from the deflections of the mapped signal points on the IQ plane.

However, if there exists some other factor than the random noise such as phase noise for example, it may occur that the CN ratio (CN_BER) obtained from the bit error rate is lowered while the CN ratio (CN_reg) obtained from the deflections of the mapped signal points on the IQ plane is not so changed.

In case the result of the decision at step ST5 signifies that the CN ratio (CN_BER) obtained from the bit error rate is lower than the CN ratio (CN_reg) obtained from the deflections of the mapped signal points on the IQ plane, the CN ratio (CN_BER) obtained from the bit error rate is selected to be displayed (i.e., CN= CN_BER) (step ST8), and the selected CN ratio is displayed as an antenna level on the display unit 19 (or the OSD circuit 22) (step ST7).

Due to the processing routine mentioned above, when the CN ratio is high to ensure a fast response and a high resolution (i.e., when the bit error rate is low), the antenna level is displayed by using the CN ratio (CN_reg) obtained from the mean value of the deflections of the mapped signal points on the IQ plane, similarly to display of the antenna level in the known digital satellite broadcast receiver. In case the picture quality is deteriorated by some other noise, such as phase noise, than the random noise, the CN ratio (CN_BER) obtained by conversion from the bit error rate is displayed as an antenna level which reflects deterioration of the signal.

In general, an error correction code is functionally inferior in correcting continuous burst noise rather than any noise caused at random timing. Therefore, momentary and successive bit errors derived from burst noise have such characteristic that the picture quality deterioration is sharper than that relative to the random noise caused with the same probability. Consequently, despite the same bit error rate, the picture quality deterioration is rendered different depending on the kind of the noise.

Calculation of the CN ratio from the bit error rate may be executed by shortening the time of evaluation of the bit error rate and achieving a fast response to the bit errors generated successively in a short period of time.

However, if the time of evaluating the bit error rate is shortened, the CN ratio is rendered unstable when the entire CN ratio is high as a whole, hence lowering the precision. More specifically, when the CN ratio is high, it follows the burst errors as obvious from FIG. 10, although a long time is required for measurement. Therefore, if the time of evaluating the error rate is shortened, the antenna level fails to serve as a reference value since the precision becomes extremely rough.

In contrast therewith, the CN ratio based on the mean value of the deflections of the mapped signal points on the IQ plane is calculated by measuring all the mapped signal points, hence acquiring a set of signal points at the highest bit rate in the entire stream flowing in the receiver. Further, as such signal points are averaged, a stable value is attainable. Consequently, when the CN ratio is high, it is possible to perform high-precision measurement of the CN ratio. On the other hand, it becomes impossible, during the averaging process, to discriminate between the burst noise and the random noise.

In view of the above problem, there may be contrived a technique of using, as a high-stability index, the CN ratio obtained from the mean value of the deflections of the mapped signal points on the IQ plane while using, as a fast-response index, the CN ratio obtained from the bit error rate.

This method is carried out fundamentally by executing the flowchart of FIG. 5, wherein "CN_reg≦CN_BER" in the branch process at step ST5 is replaced with "CN_reg≦CN_BER+CN_margin". Due to the additional provision of CN_margin, the instability of the CN ratio (CN_BER) obtained from the bit error rate is truncated to a certain degree as an error (CN_margin). And when the C/N is high, the CN ratio (CN_reg) obtained from the mean value of the deflections of the mapped signal points on the IQ plane is selectively used to attain a stable antenna level. Meanwhile, if any fall of the CN ratio (CN_BER) based on the bit error rate beyond CN_margin can be read out, it is regarded as occurrence of a burst error, and therefore the CN ratio (CN_BER) based on the bit error rate is selectively used, so that the antenna level can also reflect the signal deterioration derived from the burst error.

In the digital satellite broadcast, it is possible to perform transmission by multiplexing a plurality of moduation modes such as BPSK, QPSK and 8PSK. The characteristic of the CN ratio to the bit error rate is different in accordance with each of the individual modulation modes, and error correction can be executed within different ranges of the CN ratio respectively.

The characteristic of the CN ratio to the bit error rate is typically such that, when the CN ratio is high, an errorless state is kept continuously with the bit error rate being substantially zero, and when the CN ratio is lowered below a certain degree and under the limit of an error correction code, the detectable error rate is saturated. Consequently, in converting the CN ratio from the bit error rate, there is a limitation with regard to the area where the relationship between the bit error rate and the CN ratio changes linearly.

In the present digital satellite broadcasting, many services are transmitted in the 8PSK mode, while TMCC data are transmitted invariably in the BPSK mode. Thus, two modulation modes of 8PSK and BPSK are employed substantially in most transponders.

There may be contrived an improved method which calculates a higher-precision CN ratio by selectively switching the characteristic curves of the CN ratio and the bit error rate in such two modulation modes and utilizing merely the selected portions where a superior linearity is obtainable.

Figure 6:
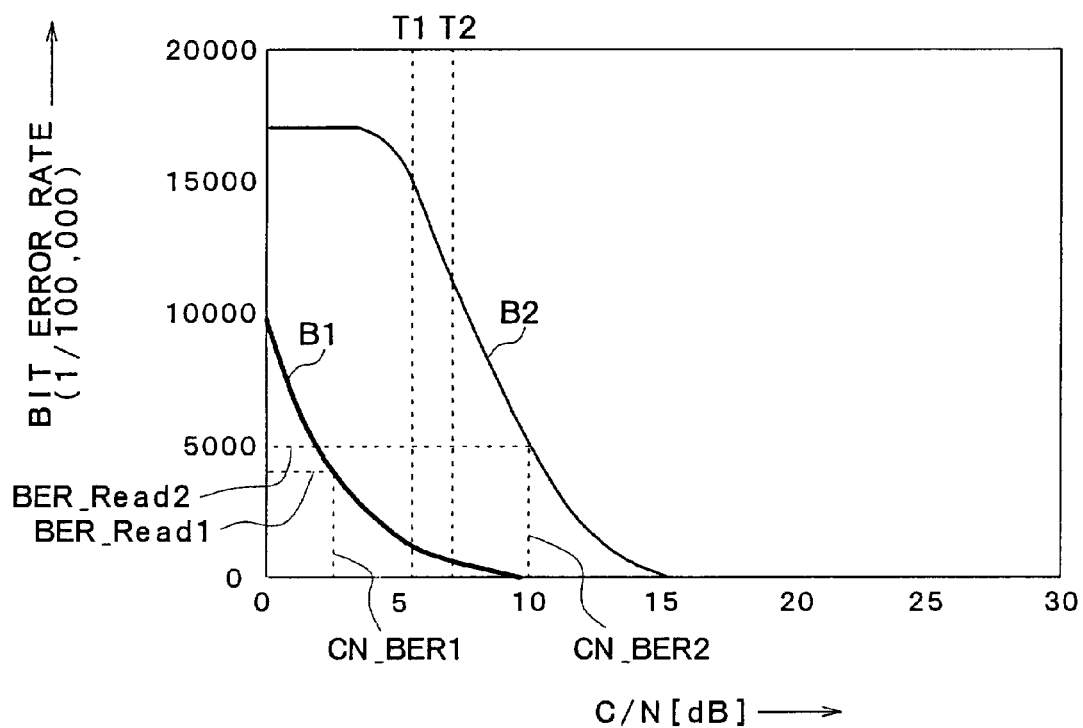
FIG. 6 graphically explains a table related to the CN ratio and a plurality of bit error rates obtained in different modulation modes.

FIG. 6 graphically shows the characteristics of the CN ratio to the bit error rate in two modulation modes of BPSK and 8PSK, wherein a curve B1 represents the relationship between the bit error rate and the CN ratio in BPSK, and a curve B2 represents the relationship between the bit error rate and the CN ratio in 8PSK. As shown in FIG. 6, when the CN ratio is low, the relationship between the bit error rate and the CN ratio changes more linearly in BPSK. And when the CN ratio is high, the relationship between the bit error rate and the CN ratio changes more linearly in 8PSK.

Therefore, when the CN ratio is obviously low, BPSK is selected and the bit error rate (BER_Read1) therein is measured. And the CN ratio (CN_BER1) is calculated from the read bit error rate (BER_Read1) in accordance with the curve B1 that represents the relationship between the bit error rate and the CN ratio in BPSK.

In case the CN ratio has risen gradually and reached a certain point where the calculated CN ratio (CN_BER1) is over a predetermined value T2, measuring the bit error rate is switched from BPSK to 8PSK. And the CN ratio (CN_BER2) is calculated from the read bit error rate (BER_Read2) in accordance with the curve B2 that represents the relationship between the bit error rate and the CN ratio in 8PSK.

Contrary to the above, when the CN ratio is obviously high, 8PSK is selected and the bit error rate (BER_Read2) therein is measured. And the CN ratio (CN_BER2) is calculated from the read bit error rate (BER_Read2) in accordance with the curve B2 that represents the relationship between the bit error rate and the CN ratio in 8PSK.

In case the CN ratio has fallen gradually and reached a certain point where the calculated CN ratio (CN_BER2) is under a predetermined value T1, measuring the bit error rate is switched from 8PSK to BPSK. And the CN ratio (CN_BER1) is calculated from the read bit error rate (BER_Read1) in accordance with the curve B1 that represents the relationship between the bit error rate and the CN ratio in BPSK.

Thus, only the partial characteristics each having a superior linearity are selectively utilized by switching the conversion tables of the CN ratio and the bit error rate in the two modulation modes, hence achieving satisfactory detection of the CN ratio to the bit error rate with the better characteristics. And a hysteresis characteristic is attained in each of the modulation switching point T2 where the CN ratio is ascendant and the modulation switching point T1 where the CN ratio is descendant, thereby realizing more stable CN ratio conversion with higher precision.

In the above embodiment, calculation of the CN ratio from the bit error rate is executed by comparing the demodulated data prior to error correction with the demodulated data obtained after correction of the inner code by Viterbi decoding and then counting the data to calculate the error rate. However, the error rate may be calculated from the data of the outer code.

As described, detection of the CN ratio is performed by a method of calculating the CN ratio in accordance with the mean value of the deflections of the mapped points of the received signal on the IQ plane, or by a method of calculating the CN ratio in accordance with the bit error rate. In one case of calculating the CN ratio from the deflections of the mapped points of the received signal on the IQ plane, high-precision measurement of the CN ratio can be achieved stably even in a high C/N area, but exact evaluation is not attainable with regard to any other unexpected noise than ramdom noise. Meanwhile in another case of calculating the CN ratio from the bit error rate, any deterioration of the received signal can be exactly evaluated regardless of the kind of the noise, although the response time characteristic is inferior in a high C/N area.

In the present invention, therefore, the CN ratio to be displayed is determined selectively in accordance with the result of a decision made about the CN ratio measured on the basis of the mean value of the deflections of the mapped signal points on the IQ plane, and also about the CN ratio measured on the basis of the bit error rate, and the result is adaptively switched to display the selected CN ratio. Consequently, even if the receiving environment is deteriorated due to some phase noise in the converter or the like, it is still possible to display the proper antenna level that faithfully reflects the receiving circumstances. And in adjusting the direction of the antenna while watching the antenna level, the stable antenna level can be displayed with a fast response.

Although the present invention has been described hereinabove with reference to some preferred embodiments thereof, it is to be understood that the invention is not limited to such embodiments alone, and a variety of other changes and modifications will be apparent to those skilled in the art without departing from the spirit of the invention.

Figure 7:
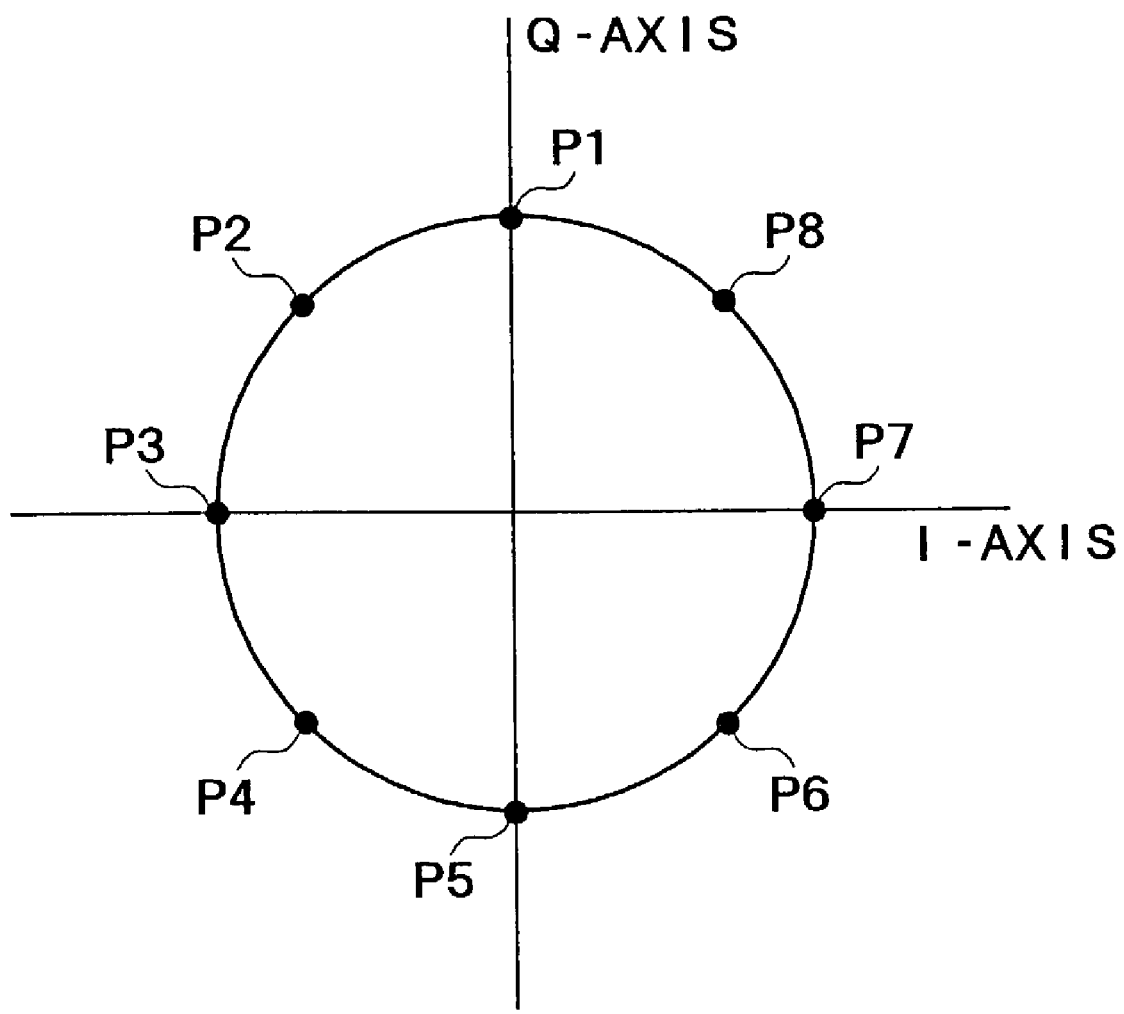
FIG. 7 graphically shows an arrangement of signal points in 8PSK.

FIG. 1, FIG. 2
  7 Viterbi decoder
  8 RS error corrector
  19 Display
  25 Microprocessor
  57 Data generator
  58 Comparator
  59 Bit error counter
  63 Decider FIG. 3
  Deflection of signal point
  C/N [db]

Figure 4:
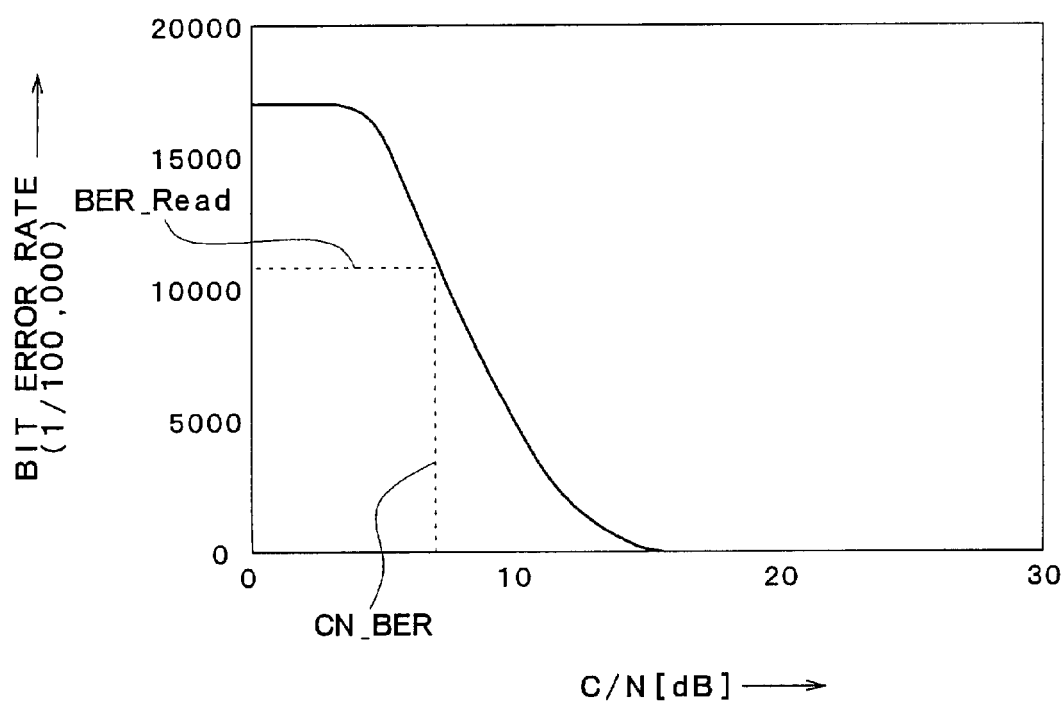
FIG. 4 graphically explains a conversion table related to the bit error rate and the CN ratio.

FIG. 4
  Bit error rate
  C/N [dB]

FIG. 5
  Start
  ST1 Obtain deflection (CN_Read) of each signal point from demodulator
  ST2 Convert deflection into CN ratio (CN_reg)
  ST3 Obtain bit error rate (BER_Read) from error counter
  ST4 Convert error rate into CN ratio (CN_BER)
  ST7 Display antenna level FIG. 6
Bit error rate C/N [dB]

FIG. 7
Q-axis I-axis

Figure 8:
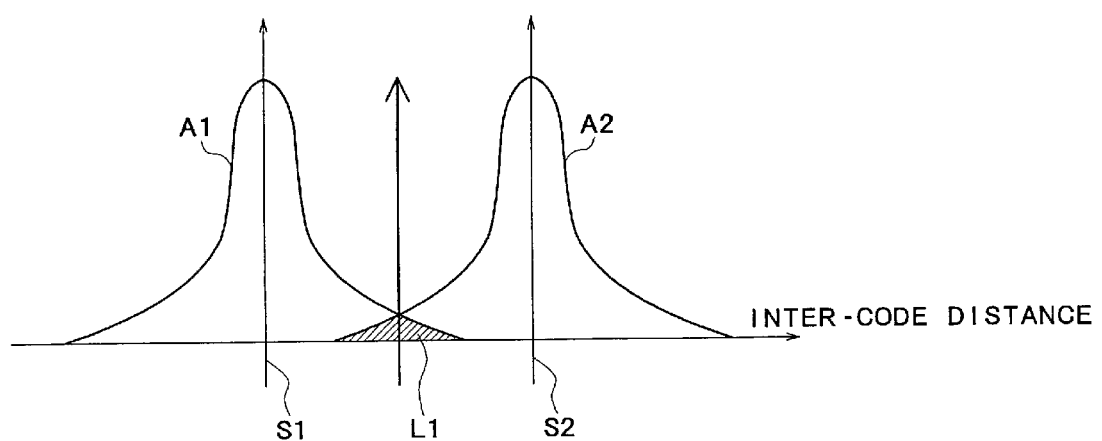
FIG. 8 graphically explains occurrence of errors in a normal distribution.

FIG. 8
Inter-code distance

FIG. 9
Q-axis I-axis

FIG. 10
C/N [dB] Bit error rate
Time required for observing one error

What is claimed is:

1. An antenna level display device comprising:
   first CN ratio calculating means for calculating a CN ratio based on the deflections of mapped points of a received signal on an IQ plane;
   second CN ratio calculating means for calculating a CN ratio based on the error rate of the received signal;
   deciding means for selecting, as an antenna level to be displayed, either the CN ratio calculated by said first CN ratio calculating means and based on the deflections of the mapped points of the received signal on the IQ plane, or the CN ratio calculated by said second CN ratio calculating means and based on the error rate; and
   display means for displaying the CN ratio selected as an antenna level by said deciding means.

2. The antenna level display device according to claim 1, wherein said first CN ratio calculating means comprises: means for executing orthogonal detection of the received signal to thereby obtain an I-signal and a Q-signal; means for calculating, from the orthogonal-detected signal, the mean value of the deflections of the mapped points of the received signal on the IQ plane; and a conversion table in which the CN ratio corresponding to the mean value of the deflections of the mapped points of the received signal on the IQ plane is stored previously; wherein the CN ratio is calculated, in accordance with said conversion table, from the mean value of the mapped points of the received signals on the IQ plane.

3. The antenna level display device according to claim 1, wherein said second CN ratio calculating means comprises: means for detecting the error rate of the received signal; and a conversion table in which the CN ratio corresponding to the error rate of the received signal is stored previously; wherein the CN ratio is calculated, in accordance with said conversion table, from the error rate of the received signal.

4. The antenna level display device according to claim 3, wherein said means for detecting the error rate comprises: means for comparing the demodulated data of the received signal prior to error correction with the demodulated data of the received signal after error correction; and means for counting the output of comparing the pre-correction demodulated data of the received signal with the post-correction demodulated data of the received signal; wherein the error rate is detected from the counted outputs of comparing the pre-correction demodulated data of the received signal with the post-correction demodulated data of the received signal.

5. The antenna level display device according to claim 3, wherein, when a plurality of data of different modulation modes are multiplexed in the received signal, conversion tables are prepared for the respective modulation modes, each conversion table containing a previously stored CN ratio which corresponds to the relevant bit error rate of the received signal; and out of the conversion tables prepared for the respective modulation modes, a portion thereof is selectively used where the CN ratio corresponding to the relevant bit error rate changes linearly.

6. The antenna level display device according to claim 5, wherein, when a portion of any of the conversion tables prepared for the respective modulation modes is selectively used where the CN ratio corresponding to the relevant bit error rate changes linearly, a hysteresis is given to the point of switching the conversion tables during a rise of the CN ratio and also to the point of switching the conversion tables during a fall of the CN ratio.

7. The antenna level display device according to claim 1, wherein said deciding means compares the CN ratio, which is based on the deflections of the mapped points of the received signal on the IQ plane, with the CN ratio based on the error rate, and when the CN ratio based on the error rate has fallen to be lower than the CN ratio based on the deflections of the mapped points of the received signal, the CN ratio based on the error rate is displayed as an antenna level, and in any other case, the CN ratio based on the deflections of the mapped points of the received signal is displayed as an antenna level.

8. The antenna level display device according to claim 7, wherein a margin is provided in comparing the CN ratio, which is based on the deflections of the mapped points of the received signal on the IQ plane, with the CN ratio based on the error rate.

9. An antenna level display method comprising the steps of:
   calculating a CN ratio based on mapped points of a received signal on an IQ plane;
   calculating a CN ratio based on an error rate;
   selecting, as an antenna level to be displayed, either the CN ratio based on the mapped points of the received signal on the IQ plane or the CN ratio based on the error rate; and
   displaying the selected CN ratio as an antenna level.

10. The antenna level display method according to claim 9, wherein the CN ratio based on the error rate is calculated by: executing orthogonal detection of the received signal to thereby obtain an I-signal and a Q-signal; calculating, from the orthogonal-detected signals, the mean value of the deflections of the mapped points of the received signal on the IQ plane; preparing a conversion table containing a previously stored CN ratio which corresponds to the mean value of the deflections of the mapped points of the received signal on the IQ plane; and calculating, in accordance with said conversion table, the CN ratio from the mean value of the mapped points of the received signal on the IQ plane.

11. The antenna level display method according to claim 9, wherein the CN ratio based on the error rate is calculated by: detecting the error rate of the received signal; preparing a conversion table containing a previously stored CN ratio which corresponds to the error rate of the received signal; and calculating, in accordance with said conversion table, the CN ratio from the error rate of the received signal.

12. The antenna level display method according to claim 11, wherein a detection of said error rate is executed by: comparing the demodulated data of the received signal prior to error correction with the demodulated data of the received signal after error correction; counting the output of comparing the pre-correction demodulated data of the received signal with the post-correction demodulated data of the received signal; and detecting the error rate from the counted outputs of comparing the pre-correction demodulated data of the received signal with the post-correction demodulated data of the received signal.

13. The antenna level display method according to claim 11, wherein, in case a plurality of data of different modulation modes are multiplexed in the received signal, conversion tables are prepared for the respective modulation modes, each conversion table containing a previously stored CN ratio which corresponds to the relevant bit error rate of the received signal; and out of the conversion tables prepared for the respective modulation modes, a portion thereof is selectively used where the CN ratio corresponding to the relevant bit error rate changes linearly.

14. The antenna level display method according to claim 13, wherein, when a portion of any of the conversion tables prepared for the respective modulation modes is selectively used where the CN ratio corresponding to the relevant bit error rate changes linearly, a hysteresis is given to the point of switching the conversion tables during a rise of the CN ratio and also to the point of switching the conversion tables during a fall of the CN ratio.

15. The antenna level display method according to claim 9, wherein a decision for selecting, as an antenna level to be displayed, either the CN ratio based on the points of the received signal or the CN ratio based on the error rate is executed by: comparing the CN ratio, which is based on the deflections of the mapped points of the received signal on the IQ plane, with the CN ratio based on the error rate; displaying the CN ratio, which is based on the error rate, as an antenna level when the CN ratio based on the error rate has fallen to be lower than the CN ratio based on the deflections of the mapped points of the received signal; or displaying, as an antenna level in any other case, the CN ratio based on the deflections of the mapped points of the received signal.

16. The antenna level display method according to claim 15, wherein a margin is provided in comparing the CN ratio, which is based on the deflections of the mapped points of the received signal on the IQ plane, with the CN ratio based on the error rate.

17. A receiving apparatus for receiving a digital television broadcast, comprising:

demodulating means for demodulating the received signal of the digital television broadcast;

first CN ratio calculating means for calculating a CN ratio based on the deflections of mapped points of the demodulated received signal on an IQ plane;

second CN ratio calculating means for calculating a CN ratio based on the error rate of the demodulated received signal;

deciding means for selecting, as an antenna level to be displayed, either the CN ratio calculated by said first CN ratio calculating means and based on the deflections of the mapped points of the received signal on the IQ plane, or the CN ratio calculated by said second CN ratio calculating means and based on the error rate; and display means for displaying the CN ratio selected by said deciding means as an antenna level.

* * * * *